United States Patent
Irving et al.

(10) Patent No.: US 7,516,061 B1
(45) Date of Patent: Apr. 7, 2009

(54) METHOD AND SYSTEM FOR USING STORED DATA ITEMS IN NATIVE DATA FORMATS IN EMULATED E-MODE PROGRAMS

(75) Inventors: Michael James Irving, Mission Viejo, CA (US); Robert Joseph Meyers, Garden Grove, CA (US); Roger Andrew Jones, Mission Viejo, CA (US)

(73) Assignee: Unisys Corporation, Blue Bell, PA (US)

( * ) Notice: Subject to any disclaimer, the term of this patent is extended or adjusted under 35 U.S.C. 154(b) by 352 days.

(21) Appl. No.: 11/118,050

(22) Filed: Apr. 29, 2005

(51) Int. Cl.
*G06F 9/455* (2006.01)
*G06F 9/44* (2006.01)
*G06F 9/45* (2006.01)

(52) U.S. Cl. .................. 703/27; 703/23; 717/134; 717/136; 717/138

(58) Field of Classification Search ............ 703/23, 703/27; 717/134, 136, 138
See application file for complete search history.

(56) References Cited

U.S. PATENT DOCUMENTS 6,662,354 B1 * 12/2003 Krablin et al. ............. 717/140
2003/0167348 A1 * 9/2003 Greenblat .................. 709/251

* cited by examiner

*Primary Examiner*—Paul L Rodriguez
*Assistant Examiner*—Dwin M Craig
(74) *Attorney, Agent, or Firm*—Phoung Quan Hoang; Robert P. Marley

(57) ABSTRACT

An embodiment of the invention is a technique for enabling an emulator that emulates an e-mode program to utilize stored data items whose values are stored in native data format in native memory. The emulator fetches an item referenced by the e-mode program. The referenced item comprises a tag field and a data field. The emulator determines whether the tag field of the referenced item indicates that the referenced item is an external reference word (ERW). If the tag field of the referenced item indicates that the referenced item is an ERW, the emulator decodes the ERW to obtain a data type and a pointer. The pointer corresponds to a location of a stored data item in native memory.

18 Claims, 7 Drawing Sheets

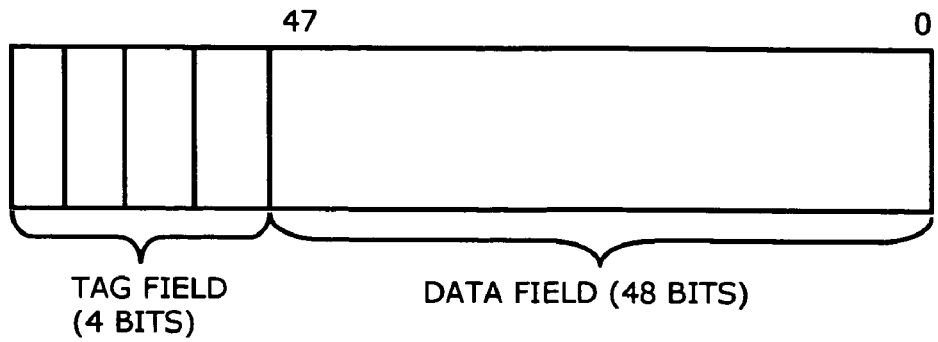
FIG. 2 *( Prior Art )*
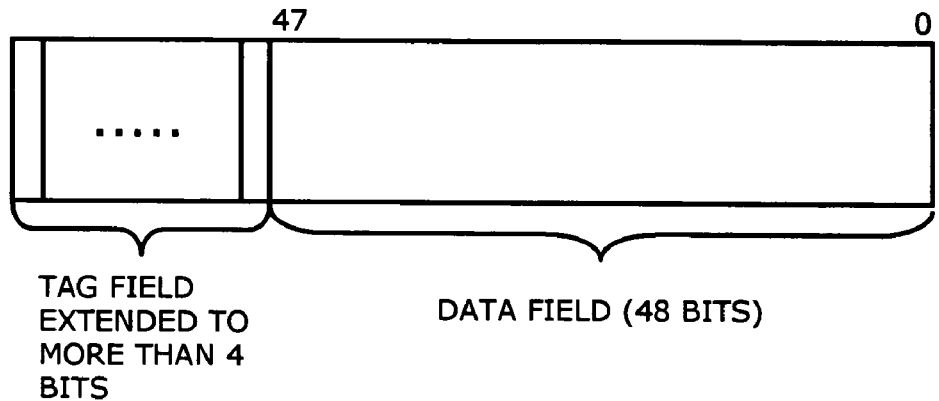
FIG. 3A
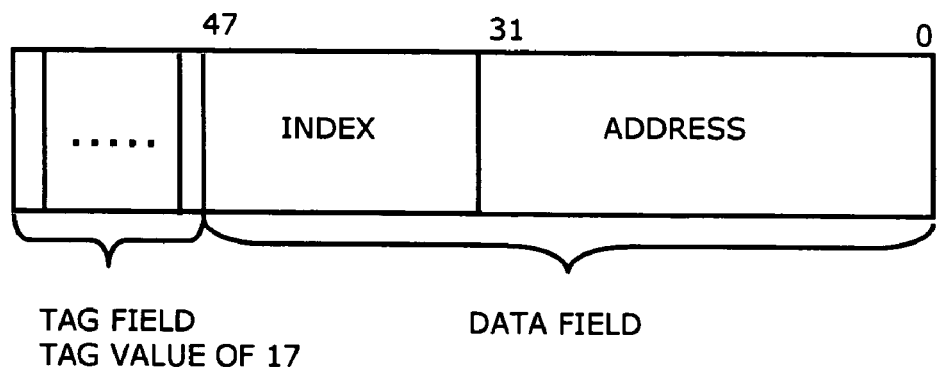
FIG. 3B

METHOD AND SYSTEM FOR USING STORED DATA ITEMS IN NATIVE DATA FORMATS IN EMULATED E-MODE PROGRAMS

BACKGROUND

1. Field of the Invention

Embodiments of the invention relates generally to methods and systems for emulating e-mode programs on a server having a different architecture and operating system platform.

2. Description of Related Art

The stack architecture of the ClearPath/NX server product line of Unisys Corporation supports the ALGOL programming language and its extensions. Their implementations are based on a specification known as e-mode. In order to run e-mode programs on a native server having a different architecture and operating system platform, such as an Intel processor-based architecture with a Microsoft Windows operating system platform, one approach is to emulate all the e-mode programs. Since all the e-mode programs are emulated, all the data items that are used by the e-mode programs are stored in e-mode data format. This approach does not take full advantage of the speed and characteristics of the native server on which the emulator is running. As a result, performance of the emulator is sub-optimal with this approach.

Another approach is to translate most critical e-mode programs to programs such as C++ programs that can be compiled to run efficiently on the native server, and to emulate only the remaining non-translated e-mode programs. If each data item that is used by both the compiled C++ programs and the emulated e-mode programs has to be stored in both native data format and e-mode format, then, in addition to causing overhead in memory storage, this will cause too much of overhead in keeping the two copies of each common data item in synchronization. If a common data item is kept only in e-mode format, there will be overhead in reformatting the data item to native data format each time a compiled C++ program needs to use the data item. The overall performance would be improved if all the data items that are used by the compiled C++ programs are stored in native data format. However, in this case, the emulator must be able to use common data items that are stored in native data format for the emulated e-mode programs. This is not possible with current emulators that cannot utilize the data items that are stored in native data format for the emulated e-mode programs. Thus, there is a need for a technique that enables an emulator to utilize the data items that are stored in native data format for the emulated e-mode programs.

SUMMARY OF THE INVENTION

An embodiment of the invention is a technique for enabling an emulator that emulates an e-mode program to utilize stored data items whose values are stored in native data format in native memory. The emulator fetches an item referenced by the e-mode program. The referenced item comprises a tag field and a data field. The emulator determines whether the tag field of the referenced item indicates that the referenced item is an external reference word (ERW). If the tag field of the referenced item indicates that the referenced item is an ERW, the emulator decodes the ERW to obtain a data type and a pointer. The pointer corresponds to a location of a stored data item in native memory.

BRIEF DESCRIPTION OF THE DRAWINGS

The invention may best be understood by referring to the following description and accompanying drawings that are used to illustrate embodiments of the invention. In the drawings:

FIG. 2 illustrates the current (prior art) e-mode format of a data item.

FIG. 3A illustrates the new e-mode format of a data item.

FIG. 3B illustrates an example of an ERW for a data item in an array in native memory.

DESCRIPTION

Figure 1:
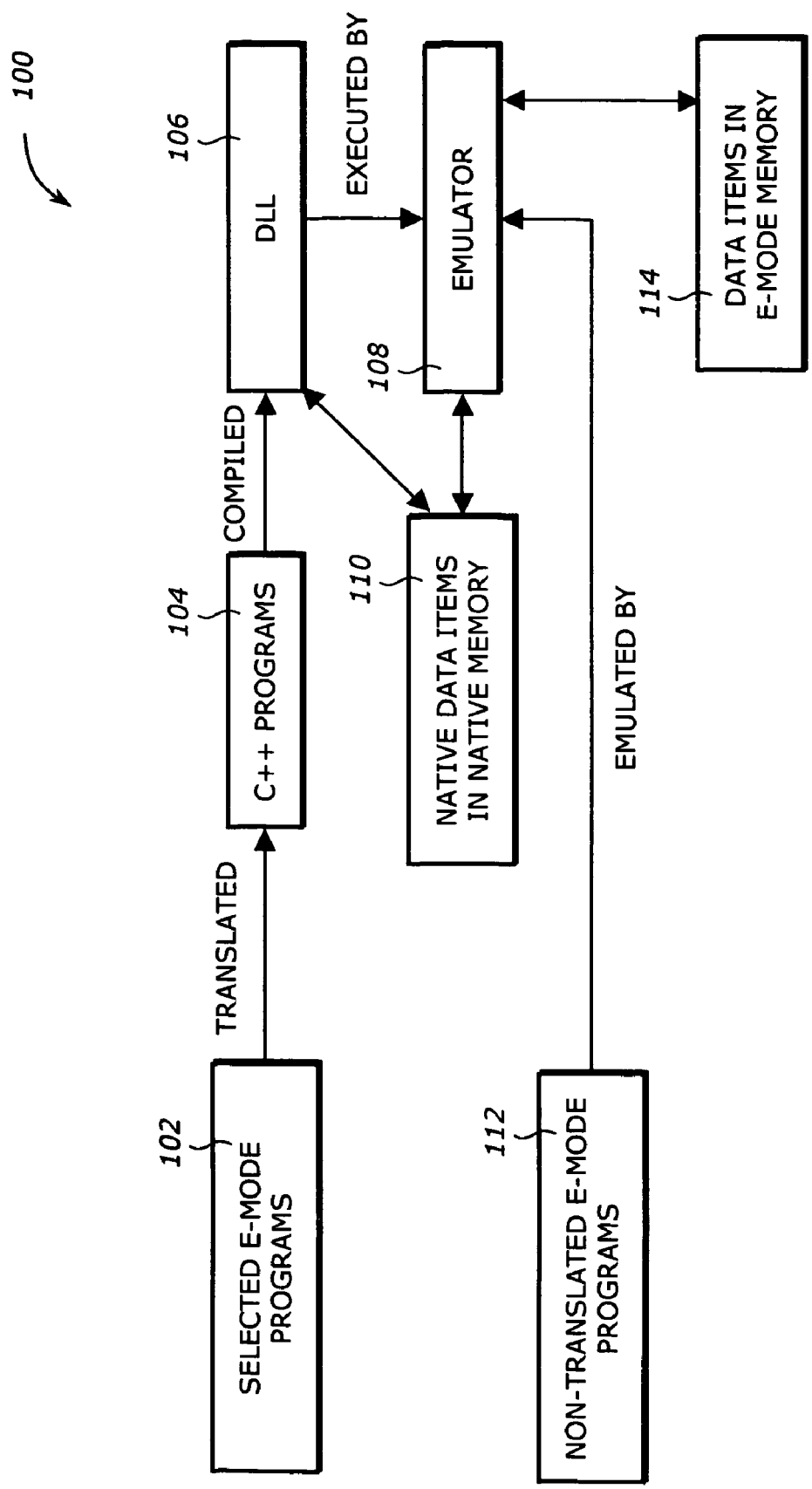
FIG. 1 is a block diagram illustrating a new system 100 in which the emulator of the present invention may be used to improve the overall performance.

An embodiment of the invention is a technique for enabling an emulator that emulates an e-mode program to utilize stored data items whose values are stored in native data format in native memory. The emulator fetches an item referenced by the e-mode program. The referenced item comprises a tag field and a data field. The emulator determines whether the tag field of the referenced item indicates that the referenced item is an external reference word (ERW). If the tag field of the referenced item indicates that the referenced item is an ERW, the emulator decodes the ERW to obtain a data type and a pointer. The pointer corresponds to a location of a stored data item in native memory.

The technique of the present invention can significantly enhance the performance of the emulator in which the technique is implemented. The specific implementation employed may vary depending on the definitions of the different ERWs and their specific representations.

In the following description, numerous specific details are set forth. However, it is understood that embodiments of the invention may be practiced without these specific details. In other instances, well-known circuits, structures, and techniques have not been shown in order not to obscure the understanding of this description.

One embodiment of the invention may be described as a process which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a program, a procedure, etc.

The stack architecture of the ClearPath/NX server product line of Unisys Corporation supports the ALGOL programming language and its extensions. Their implementations are based on a specification known as e-mode. In order to run e-mode programs on a native server having a different architecture and operating system platform, such as an Intel processor-based architecture with a Microsoft Windows operating system platform, one approach is to emulate all the e-mode programs. Since all the e-mode programs are emulated, all the data items that are used by the e-mode programs are stored in e-mode data format. This approach does not take full advantage of the speed and characteristics of the native server on which the emulator is running. As a result, performance of the emulator is sub-optimal with this approach.

A new approach is to translate most critical e-mode programs to programs such as C++ programs that can be compiled into Dynamic Link Libraries (DLLs) to run efficiently on the native server, and to emulate only the remaining non-translated e-mode programs. Since the non-translated e-mode programs are usually not critical, the overall performance of this approach (measured as speed of the execution and emulation of the programs) depends mostly on the performance of the DLLs. Therefore, the overall performance will be improved if all the data items that are used by the compiled C++ programs are stored in native data format. The method of the present invention enables the emulator to utilize the data items that are stored in native data format for the emulated e-mode programs.

FIG. 1 is a block diagram illustrating a new system 100 in which the emulator of the present invention may be used to improve the overall performance.

All e-mode programs can be translated to C++ programs. E-mode programs that cannot be translated via automated translation can be manually translated at a higher cost. Critical e-mode programs are usually selected to be translated.

The selected e-mode programs 102 are translated into C++ programs 104 which are then compiled into Dynamic Link Libraries (DLLs) for a native server platform (such as Intel processor/Windows operating system). When a selected e-mode program 102 is run, the emulator 108 executes the corresponding DLL rather than emulating the original e-mode program 102, producing identical results in significantly less time. Data items 110 used or generated by the DLLs are stored in native data format in native memory.

The non-translated e-mode programs 112 are emulated on the fly by the emulator 108. The emulator 108 of the present invention is capable of using the stored data items in native data format 110 as input for the emulated e-mode programs 112. The emulator 108 is also capable of converting a data item generated by the emulated e-mode program to native data format and storing it in the native memory at a specified address. Data items that are used only by the emulated e-mode programs 112 and not by the DLLs 106 are stored in e-mode memory 114. E-mode memory 114 may include a stack or an array in memory.

FIG. 2 illustrates the current (prior art) e-mode format of a data item. Each data item word in e-mode format includes a data field of 48-bits (bit 0 through bit 47) and a tag field of 4 bits (bit 48 through bit 51). The values 0 through 15 of the tag field are used by the e-mode operators to determine the data type of the data item. For example, a tag value of 0 indicates that the content of the 48-bit data field is a single precision real number. A double precision number is composed of two data item words, each with a tag value of 2. A descriptor which defines an area of memory has a tag value of 12.

In accordance with the method of present invention, the tag field of a data item in e-mode format is extended to more than 4 bits, so that a specific tag value above 15 can be used to indicate that the corresponding data item is an external reference word (ERW) of a particular type. In one embodiment, the tag field is 8 bits long. ERW is a new type of e-mode data item introduced by the present invention in order to find and access a data item stored in native data format in native memory. The remaining 48 bits of the ERW contains information about the location of a data item stored in native memory, which can be decoded by the emulator to locate the stored data item. For example, a tag value of 16 may be used to indicate that the ERW is for a single precision number; the remaining 48 bits of the ERW contains a pointer to the location of this single precision number in native memory. A tag value of 18 may be used to indicate that the ERW is for a double precision number; the remaining 48 bits of the ERW contains a pointer to the location of this double precision number in native memory. Note that, since a double precision number is stored in two consecutive locations in memory, only the address of the first location is needed to locate this number.

In accordance with the present invention, the operators in the emulator are modified to be able to accept ERWs as inputs. For example: one of e-mode architecture's most common operators is VALC (value call) which fetches a data item and places the data item on top of a stack. In the prior art, the first reference to the data item is encoded within the operator stream. This reference may point to the data item itself, or to an indirect reference word (a SIRW). This SIRW may then point to the data item or another SIRW, and so on. The VALC operator follows a reference chain for as long as it goes.

In the present invention, the VALC operator is modified to recognize an ERW from the tag field of the ERW so that the VALC operator can then fetch the data item directly from native memory as directed by the remainder of the ERW and convert it to e-mode format. Similarly, the StoreDelete (STOD) operator is modified to recognize an ERW on the stack so that the STOD operator can then convert the data to be stored to native format and use the location information in the ERW to store the converted data.

Referring to FIG. 1, when a DLL 106 needs to call an external procedure, the emulator 108 determines whether the external procedure is another DLL or an e-mode program 112. At the point in time where the emulator determines that the external procedure that is going to be called by the DLL with stored data items as parameters is an e-mode program, the emulator constructs the ERWs corresponding to the stored data items and puts the ERWs on the stack to pass the ERWs as parameters to the e-mode program.

FIG. 3A illustrates the new e-mode format of a data item. The tag field is more than 4 bits long. The data field is 48-bit long.

FIG. 3B illustrates an example of an ERW for a data item in an array in native memory. The tag value is 17. The first 32 bits of the data field provide the address of the array, which is a pointer to the base of the array. The remaining 16 bits of the data field provide an index to the array, which points to a specific element in the array.

Figure 4:
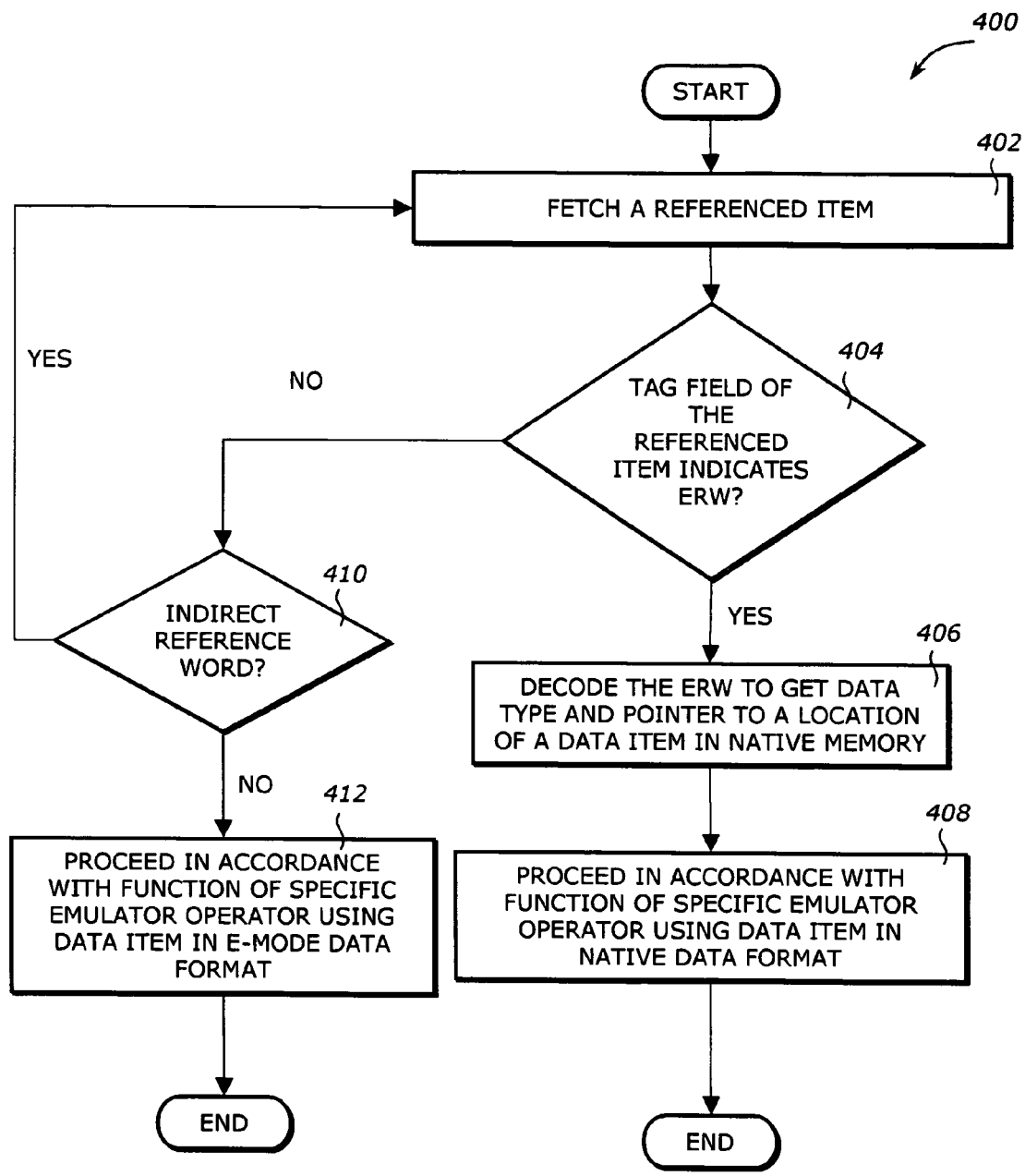
FIG. 4 is a flowchart illustrating the process 400 of the present invention.

FIG. 4 is a flowchart illustrating the process 400 of the present invention. This process is used by various operators of the emulator 108 that emulates an e-mode program 112 (FIG. 1) to utilize stored data items whose values are stored in native data format in native memory.

Upon Start, process 400 fetches an item referenced by the e-mode program, the referenced item comprising a tag field and a data field (block 402). Process 400 determines whether the tag field of the referenced item indicates that the referenced item is an external reference word (ERW) (block 404). If the tag field of the referenced item indicates that the referenced item is an ERW, process 400 decodes the ERW to obtain a data type and a pointer, the pointer corresponding to a location of a stored data item in native memory (block 406). Process 400 then proceeds in accordance with the function of the specific emulator operator being in use, using the data item in native data format (block 408) then process 400 is terminated. If the tag field of the referenced item does not indicate that the referenced item is an ERW, process 400 determines whether the tag field indicates that the referenced item is an indirect reference word (SIRW) (block 410). Note that SIRW is a known type of data item in prior art e-mode format. A SIRW may point to another SIRW or to the final data item. If the tag field indicates an indirect reference word, process 400 fetches the item that is referenced by the indirect reference word (block 402) and continues to block 404 as described above. If the tag field does not indicate an indirect reference word (meaning the data field of the referenced item contains the data item itself in e-mode data format), process 400 proceeds in accordance with the function of the specific emulator operator being in use, using the data item in e-mode data format (block 412), then process 400 is terminated.

Figure 5:
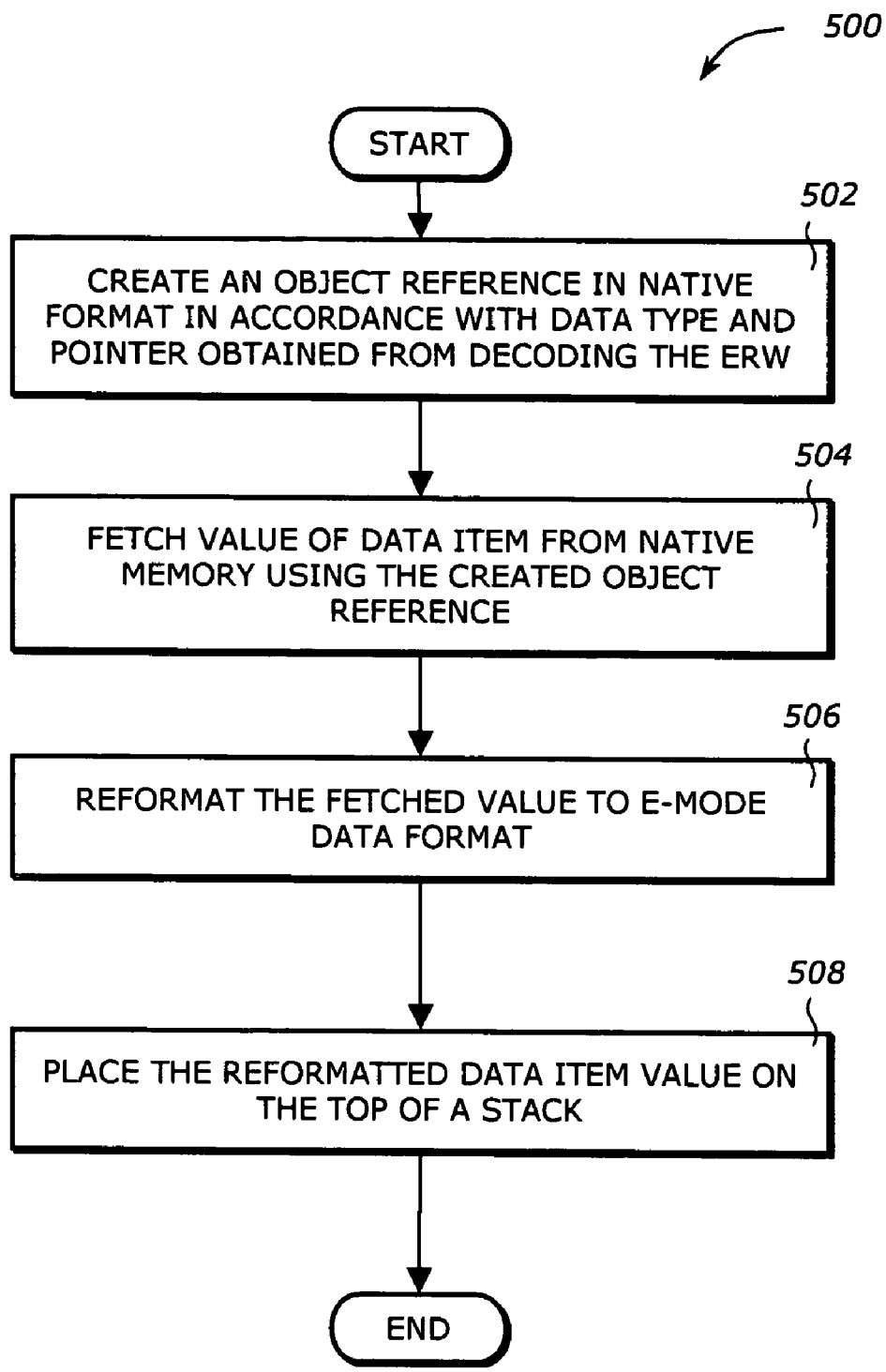
FIG. 5 is a flowchart illustrating an embodiment 500 of block 408 of FIG. 4, when the specific emulator operator being in use is a ValueCall (VALC) operator.

FIG. 5 is a flowchart illustrating an embodiment 500 of block 408 of FIG. 4, when the specific emulator operator being in use is a ValueCall (VALC) operator. Upon Start, process 500 creates an object reference in native format in accordance with the data type and pointer that have been obtained from decoding the ERW (block 502). Note that, although the pointer obtained from decoding the ERW provides the location of the data item in the native memory, it is not in native format that can be used directly to access that location. Process 500 fetches the value of the stored data item from the native memory using the newly created object reference (block 504). Process 500 reformats the fetched data item value to e-mode data format (block 506). Process 500 places the reformatted data item value on top of a stack to provide the reformatted value to the e-mode program (block 508), then is terminated.

Figure 6:
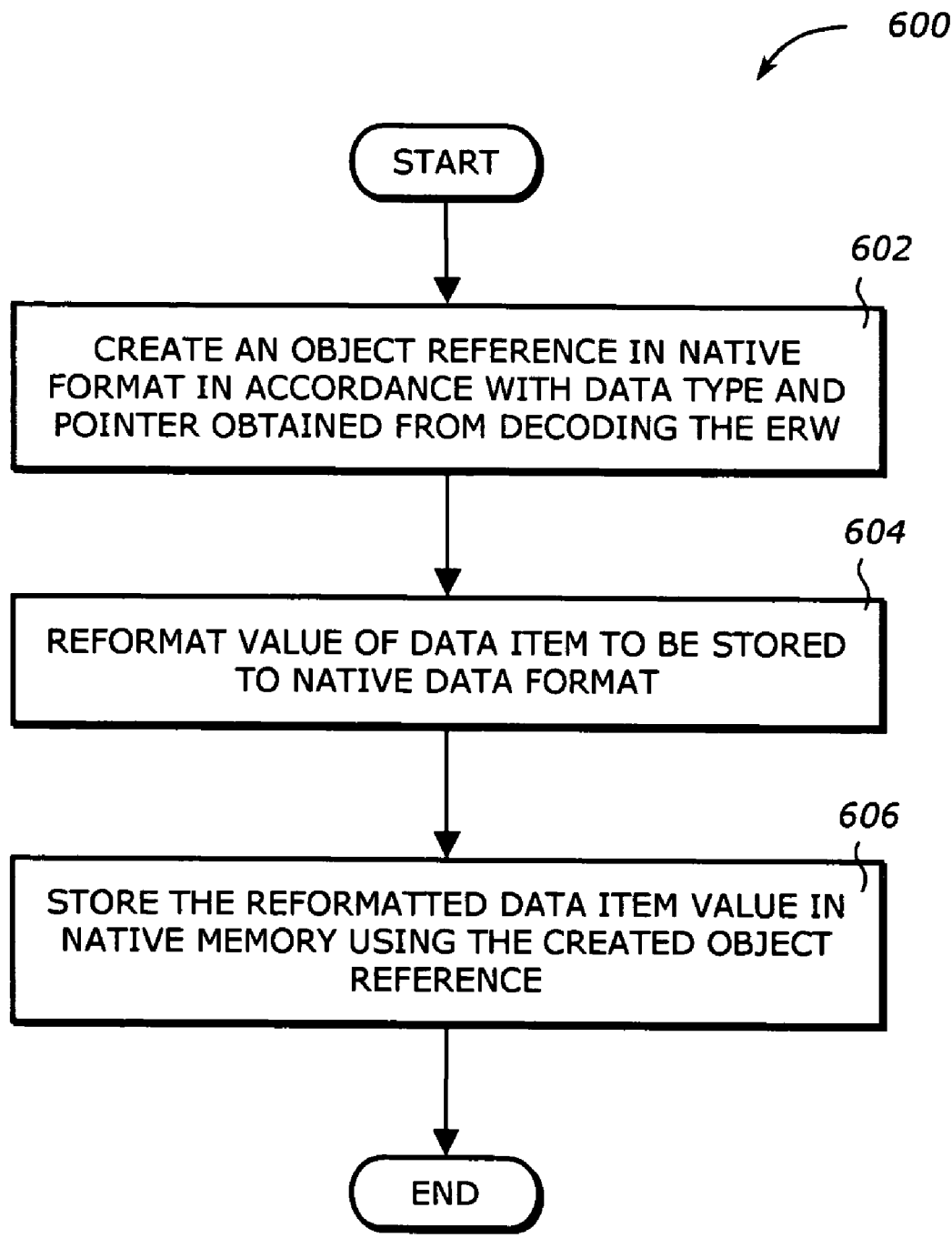
FIG. 6 is a flowchart illustrating an embodiment 600 of block 408 of FIG. 4, for a StoreDelete (STOD) operator of the emulator.

FIG. 6 is a flowchart illustrating an embodiment 600 of block 408 of FIG. 4, for a StoreDelete (STOD) operator of the emulator. Upon Start, process 600 creates an object reference in native format in accordance with the data type and pointer that have been obtained from decoding the ERW (block 602). The obtained data type indicates the data type of the data item to be stored. The obtained pointer provides the information about the location in native memory where the data item is to be stored, but is not in native format that can be used directly to access that location. Process 600 reformats to native data format the value of the data item to be stored (block 604). Process 600 stores the reformatted data item value in native memory using the created object reference (block 606), then process 700 is terminated.

Figure 7:
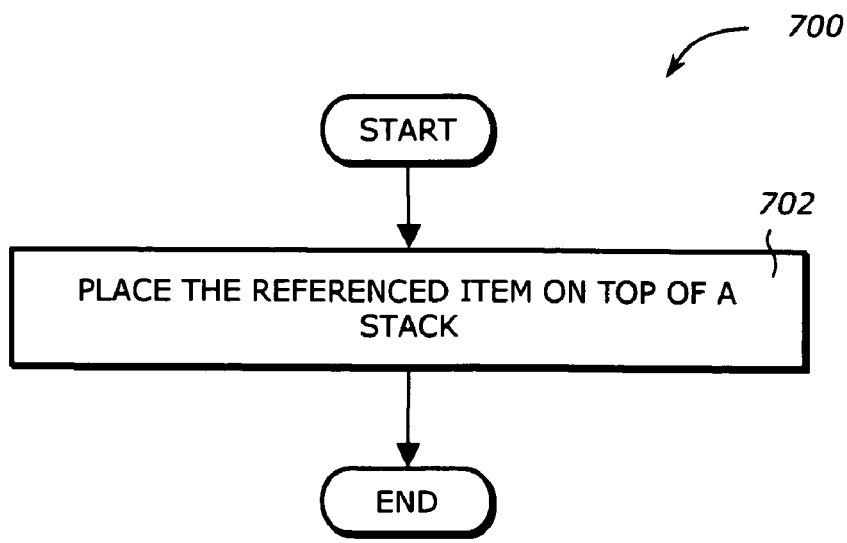
FIG. 7 is a flowchart illustrating an embodiment 700 of block 412 of FIG. 4, for a ValueCall (VALC) operator of the emulator.

FIG. 7 is a flowchart illustrating an embodiment 700 of block 412 of FIG. 4, for a ValueCall (VALC) operator of the emulator. Upon Start, process 700 places the referenced item that is in e-mode data format on top of a stack (block 702), then process 700 is terminated.

Figure 8:
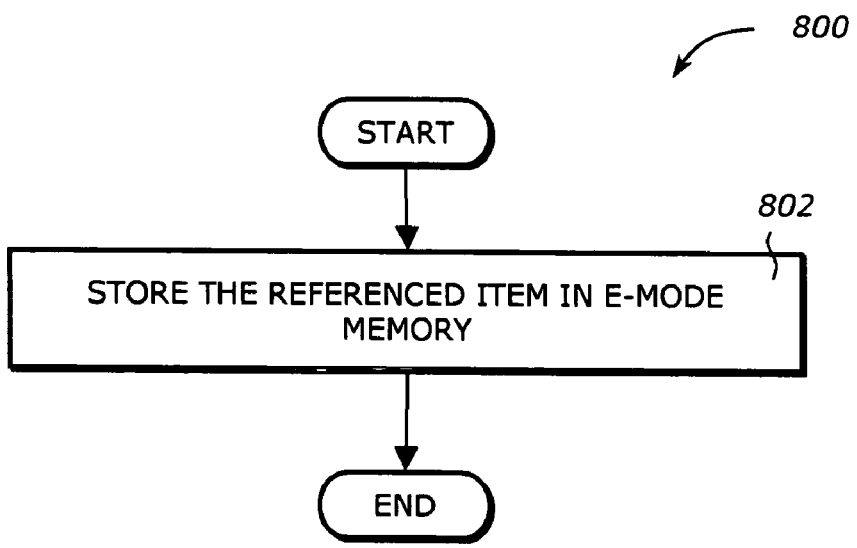
FIG. 8 is a flowchart illustrating an embodiment 800 of block 412 of FIG. 4, for a StoreDelete (STOD) operator of the emulator.

FIG. 8 is a flowchart illustrating an embodiment 800 of block 412 of FIG. 4, for a StoreDelete (STOD) operator of the emulator. Upon Start, process 800 places the referenced item that is in e-mode data format in e-mode memory (block 802), then process 800 is terminated.

Figure 9:
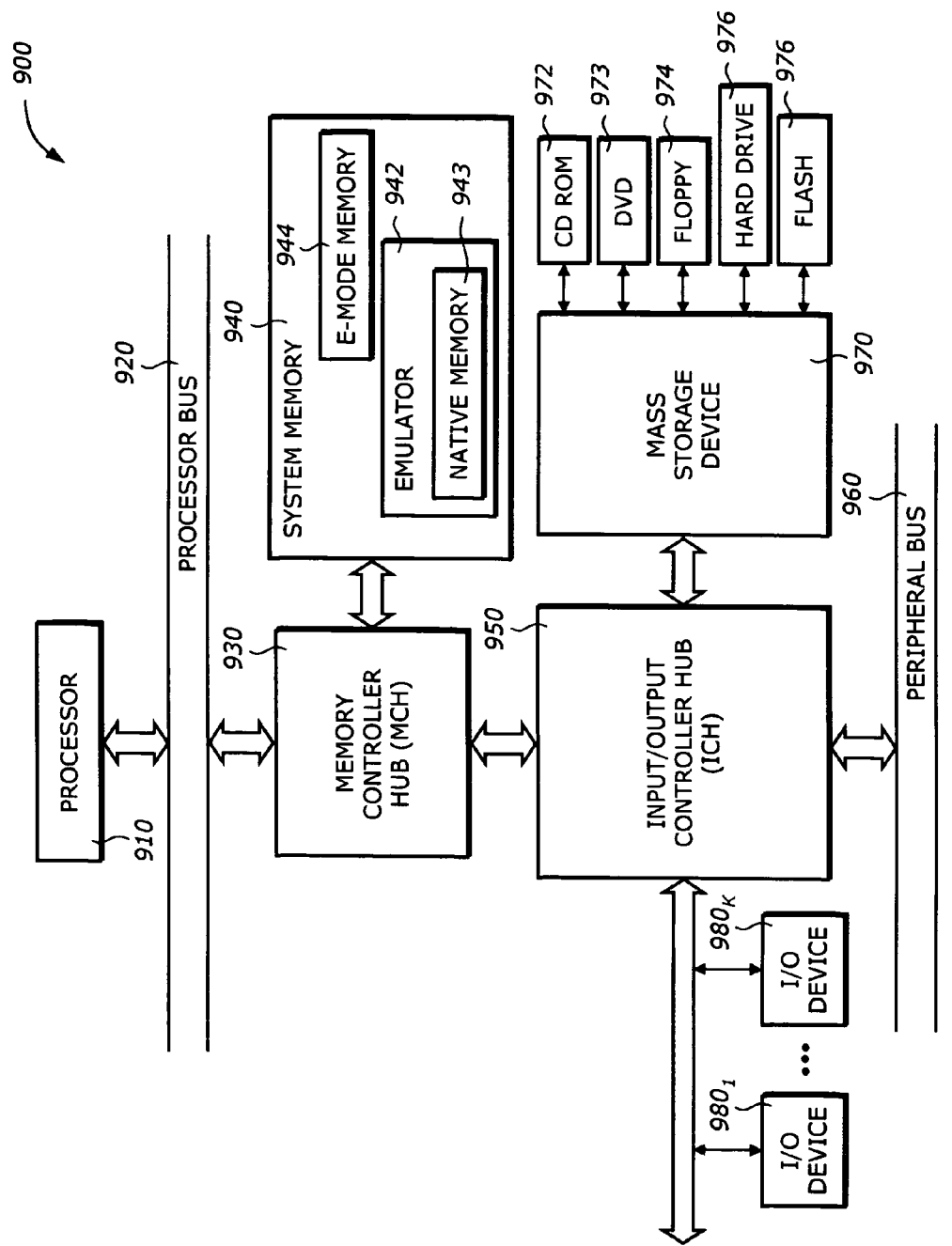
FIG. 9 is a diagram illustrating a server/client system 900 in which one embodiment of the invention can be practiced.

FIG. 9 is a diagram illustrating a server/client system 900 in which one embodiment of the invention can be practiced. The server/client system 900 includes a processor 910, a processor bus 920, a memory control hub (MCH) 930, a system memory 940, an input/output control hub (ICH) 950, a peripheral bus 960, a mass storage device 970, and input/output devices 980$_1$ to 980$_K$. Note that the server/client system 900 may include more or less elements than these elements.

The processor 910 represents a central processing unit of any type of architecture, such as embedded processors, mobile processors, micro-controllers, digital signal processors, superscalar computers, vector processors, single instruction multiple data (SIMD) computers, complex instruction set computers (CISC), reduced instruction set computers (RISC), very long instruction word (VLIW), or hybrid architecture.

The processor bus 920 provides interface signals to allow the processor 910 to communicate with other processors or devices, e.g., the MCH 930. The host bus 920 may support a uniprocessor or multiprocessor configuration. The host bus 920 may be parallel, sequential, pipelined, asynchronous, synchronous, or any combination thereof.

The MCH 930 provides control and configuration of memory and input/output devices such as the system memory 940, the ICH 950. The MCH 930 may be integrated into a chipset that integrates multiple functionalities such as the isolated execution mode, host-to-peripheral bus interface, memory control. The MCH 930 interfaces with the peripheral bus 960. For clarity, not all the peripheral buses are shown.

The system memory 940 stores system code and data. The subsystem memory 940 is typically implemented with dynamic random access memory (DRAM) or static random access memory (SRAM). The system memory 940 may include program code or code segments implementing one embodiment of the invention. The system memory 940 includes an emulator 942 and e-mode memory 944. Any one of the elements of the emulator 942 may be implemented by hardware, software, firmware, microcode, or any combination thereof. The system memory 940 may also include other programs or data that are not shown, such as an operating system. The emulator 942 contains program code that, when executed by the processor 910, causes the processor 910 to perform operations as described herein. The emulator 942 also includes native memory 943.

The ICH 950 has a number of functionalities that are designed to support I/O functions. The ICH 950 may also be integrated into a chipset together or separate from the MCH 930 to perform I/O functions. The ICH 950 may include a number of interface and I/O functions such as PCI bus interface to interface with the peripheral bus 960, processor interface, interrupt controller, direct memory access (DMA) controller, power management logic, timer, system management bus (SMBus), universal serial bus (USB) interface, mass storage interface, low pin count (LPC) interface, etc.

The mass storage device 970 stores archive information such as code, programs, files, data, applications, and operating systems. The mass storage device 970 may include compact disk (CD) ROM 972, a digital video/versatile disc (DVD) 973, floppy drive 974, hard drive 976, flash memory 978, and any other magnetic or optic storage devices. The mass storage device 970 provides a mechanism to read machine-accessible media. The machine-accessible media may contain computer readable program code to perform tasks as described herein.

The I/O devices 980$_1$ to 980$_K$ may include any I/O devices to perform I/O functions. Examples of I/O devices 980$_1$ to 980$_K$ include controller for input devices (e.g., keyboard, mouse, trackball, pointing device), media card (e.g., audio, video, graphics), network card, and any other peripheral controllers.

Elements of one embodiment of the invention may be implemented by hardware, firmware, software or any combination thereof. The term hardware generally refers to an element having a physical structure such as electronic, electromagnetic, optical, electro-optical, mechanical, electromechanical parts, etc. The term software generally refers to a logical structure, a method, a procedure, a program, a routine, a process, an algorithm, a formula, a function, an expression, etc. The term firmware generally refers to a logical structure, a method, a procedure, a program, a routine, a process, an algorithm, a formula, a function, an expression, etc that is implemented or embodied in a hardware structure (e.g., flash memory, ROM, EROM). Examples of firmware may include microcode, writable control store, micro-programmed structure. When implemented in software or firmware, the elements of an embodiment of the present invention are essentially the code segments to perform the necessary tasks. The software/firmware may include the actual code to carry out the operations described in one embodiment of the invention, or code that emulates or simulates the operations. The program or code segments can be stored in a processor or machine accessible medium or transmitted by a computer data signal embodied in a carrier wave, or a signal modulated by a carrier, over a transmission medium. The "processor readable or accessible medium" or "machine readable or accessible medium" may include any medium that can store, transmit, or transfer information. Examples of the processor readable or machine accessible medium include an electronic circuit, a semiconductor memory device, a read only memory (ROM), a flash memory, an erasable ROM (EROM), a floppy diskette, a compact disk (CD) ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc. The machine accessible medium may be embodied in an article of manufacture. The machine accessible medium may include data that, when accessed by a machine, cause the machine to perform the operations described herein. The machine accessible medium may also include program code embedded therein. The program code may include machine readable code to perform the operations described in the following. The term "data" here refers to any type of information that is encoded for machine-readable purposes. Therefore, it may include program, code, data, file, etc.

All or part of an embodiment of the invention may be implemented by hardware, software, or firmware, or any combination thereof. The hardware, software, or firmware element may have several modules coupled to one another. A hardware module is coupled to another module by mechanical, electrical, optical, electromagnetic or any physical connections. A software module is coupled to another module by a function, procedure, method, subprogram, or subroutine call, a jump, a link, a parameter, variable, and argument passing, a function return, etc. A software module is coupled to another module to receive variables, parameters, arguments, pointers, etc. and/or to generate or pass results, updated variables, pointers, etc. A firmware module is coupled to another module by any combination of hardware and software coupling methods above. A hardware, software, or firmware module may be coupled to any one of another hardware, software, or firmware module. A module may also be a software driver or interface to interact with the operating system running on the platform. A module may also be a hardware driver to configure, set up, initialize, send and receive data to and from a hardware device. An apparatus may include any combination of hardware, software, and firmware modules.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting.

What is claimed is:

1. A method for enabling an emulator that emulates an e-mode program to utilize stored data items whose values are stored in native data format in native memory, the method comprising the emulator operations of:
   (a) fetching an item referenced by the e-mode program, the referenced item comprising a tag field and a data field;
   (b) determining whether the tag field of the referenced item indicates that the referenced item is an external reference word (ERW), the ERW being constructed by the emulator and placed on a stack as a parameter for the e-mode program at a point in time where the emulator determines that the e-mode program is going to be called by a native Dynamic Link Library with the corresponding stored data item as a parameter; and
   (c) if the tag field of the referenced item indicates that the referenced item is an ERW, decoding the ERW to obtain a data type and a pointer, the pointer corresponding to a location of a stored data item in native memory.

2. The method of claim 1 wherein the operations are performed by a ValueCall (VALC) operator of the emulator and operation (c) further comprises:
   creating an object reference in native format in accordance with the obtained data type and pointer;
   fetching value of the stored data item from native memory using the created object reference;
   reformatting the fetched data item value to e-mode data format; and
   placing the reformatted data item value on top of a stack to provide the reformatted value to the e-mode program.

3. The method of claim 1 wherein the operations are performed by a StoreDelete (STOD) operator of the emulator and operation (c) further comprises:
   creating an object reference in native format in accordance with the obtained data type and pointer;
   reformatting to native data format value of a data item to be stored; and
   storing the reformatted data item value in native memory using the created object reference.

4. The method of claim 1 wherein the operations are performed by a ValueCall (VALC) operator of the emulator, the method further comprising:
   (d) if the tag field of the referenced item does not indicate that the referenced item is an ERW,
   determining whether the tag field indicates an indirect reference word;
   if the tag field indicates an indirect reference word, fetching an item referenced by the indirect reference word;
   if the tag field does not indicate an indirect reference word, placing the referenced item on top of a stack.

5. The method of claim 1 wherein the operations are performed by a StoreDelete (STOD) operator of the emulator, the method further comprising:

(d) if the tag field of the referenced item does not indicate an ERW, determining whether the tag field indicates an indirect reference word; and if the tag field indicates an indirect reference word, fetching an item referenced by the indirect reference word;

if the tag field does not indicate an indirect reference word, storing the referenced item in an e-mode memory.

6. The method of claim 1 wherein the tag field comprises more than four bits.

7. An article of manufacture comprising:
a machine accessible storage medium including data that, when accessed by a computer, causes the computer to perform operations of an emulator for enabling the emulator that emulates an e-mode program to utilize stored data items whose values are stored in native data format in native memory, the operations comprising:
 (a) fetching an item referenced by the e-mode program, the referenced item comprising a tag field and a data field;
 (b) determining whether the tag field of the referenced item indicates that the referenced item is an external reference word (ERW), the ERW being constructed by the emulator and placed on a stack as a parameter for the e-mode program at a point in time where the emulator determines that the e-mode program is going to be called by a native Dynamic Link Library with the corresponding stored data item as a parameter; and
 (c) if the tag field of the referenced item indicates that the referenced item is an ERW, decoding the ERW to obtain a data type and a pointer, the pointer corresponding to a location of a stored data item in native memory.

8. The article of manufacture of claim 7 wherein the operations performed by the computer are for a ValueCall (VALC) operator of the emulator and wherein the data causing the computer to perform the operation (c) further comprises data that, when accessed by the computer, causes the computer to perform operations comprising:
 creating an object reference in native format in accordance with the obtained data type and pointer;
 fetching value of the stored data item from native memory using the created object reference;
 reformatting the fetched data item value to e-mode data format; and
 placing the reformatted data item value on top of a stack to provide the reformatted value to the e-mode program.

9. The article of manufacture of claim 7 wherein the operations performed by the computer are for a StoreDelete (STOD) operator of the emulator and wherein the data causing the computer to perform the operation (c) further comprises data that, when accessed by the computer, causes the computer to perform operations comprising:
 creating an object reference in native format in accordance with the obtained data type and pointer;
 reformatting to native data format value of a data item to be stored; and
 storing the reformatted data item value in native memory using the created object reference.

10. The article of manufacture of claim 7 wherein the operations performed by the computer are for a ValueCall (VALC) operator of the emulator and wherein the data further causes the computer to perform operations comprising:
 (d) if the tag field of the referenced item does not indicate that the referenced item is an ERW,
 determining whether the tag field indicates an indirect reference word;
 if the tag field indicates an indirect reference word, fetching an item referenced by the indirect reference word;

if the tag field does not indicate an indirect reference word, placing the referenced item on top of a stack.

11. The article of manufacture of claim 7 wherein the operations performed by the computer are for a StoreDelete (STOD) operator of the emulator and wherein the data further causes the computer to perform operations comprising:
 (d) if the tag field of the referenced item does not indicate an ERW,
 determining whether the tag field indicates an indirect reference word; and
 if the tag field indicates an indirect reference word, fetching an item referenced by the indirect reference word;
 if the tag field does not indicate an indirect reference word, storing the referenced item in an e-mode memory.

12. The article of manufacture of claim 7 wherein the tag field of the referenced item comprises more than four bits.

13. A system for enabling an emulator that emulates an e-mode program to utilize stored data items whose values are stored in native data format in native memory, the system comprising:
 a processor;
 a system memory coupled to the processor, the system memory containing program code that, when executed by the processor, causes the processor to perform operations comprising:
 (a) fetching an item referenced by the e-mode program, the referenced item comprising a tag field and a data field;
 (b) determining whether the tag field of the referenced item indicates that the referenced item is an external reference word (ERW), the ERW being constructed by the emulator and placed on a stack as a parameter for the e-mode program at a point in time where the emulator determines that the e-mode program is going to be called by a native Dynamic Link Library with the corresponding stored data item as a parameter; and
 (c) if the tag field of the referenced item indicates that the referenced item is an ERW, decoding the ERW to obtain a data type and a pointer, the pointer corresponding to a location of a stored data item in native memory.

14. The system of claim 13 wherein the operations performed by the processor are for a ValueCall (VALC) operator of the emulator and wherein the program code causing the processor to perform the operation (c) further comprises program code that, when executed by the processor, causes the processor to perform operations comprising:
 creating an object reference in native format in accordance with the obtained data type and pointer;
 fetching value of the stored data item from native memory using the created object reference;
 reformatting the fetched data item value to e-mode data format; and
 placing the reformatted data item value on top of a stack to provide the reformatted value to the e-mode program.

15. The system of claim 13 wherein the operations performed by the processor are for a StoreDelete (STOD) operator of the emulator and wherein the program code causing the processor to perform the operation (c) further comprises program code that, when executed by the processor, causes the processor to perform operations comprising:
 creating an object reference in native format in accordance with the obtained data type and pointer;
 reformatting to native data format value of a data item to be stored; and
 storing the reformatted data item value in native memory included in the system memory using the created object reference.

16. The system of claim 13 wherein the operations performed by the processor are for a ValueCall (VALC) operator of the emulator and wherein the program code further causes the processor to perform operations comprising:
- (d) if the tag field of the referenced item does not indicate that the referenced item is an ERW,
- determining whether the tag field indicates an indirect reference word;
- if the tag field indicates an indirect reference word, fetching an item referenced by the indirect reference word;
- if the tag field does not indicate an indirect reference word, placing the referenced item on top of a stack.

17. The system of claim 13 wherein the operations performed by the processor are for a StoreDelete (STOD) operator of the emulator and wherein the program code further causes the processor to perform operations comprising:
- (d) if the tag field of the referenced item does not indicate an ERW,
- determining whether the tag field indicates an indirect reference word; and
- if the tag field indicates an indirect reference word, fetching an item referenced by the indirect reference word;
- if the tag field does not indicate an indirect reference word, storing the referenced item in an e-mode memory included in the system memory.

18. The system of claim 13 wherein the tag field of the referenced item comprises more than four bits.

* * * * *